(12) United States Patent
Aitharaju et al.

(10) Patent No.: US 9,399,490 B2
(45) Date of Patent: Jul. 26, 2016

(54) FENDER BRACKET

(71) Applicant: GM GLOBAL TECHNOLOGY OPERATIONS LLC, Detroit, MI (US)

(72) Inventors: Venkat Aitharaju, Troy, MI (US); Hamid G. Kia, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/445,719

(22) Filed: Jul. 29, 2014

(65) Prior Publication Data
US 2015/0035317 A1 Feb. 5, 2015

Related U.S. Application Data

(60) Provisional application No. 61/860,034, filed on Jul. 30, 2013.

(51) Int. Cl.
*B62D 25/16* (2006.01)
*B29C 70/68* (2006.01)
*B29C 70/72* (2006.01)
*B29L 31/30* (2006.01)

(52) U.S. Cl.
CPC .............. *B62D 25/163* (2013.01); *B29C 70/72* (2013.01); *B29K 2995/0003* (2013.01); *B29L 2031/30* (2013.01)

(58) Field of Classification Search
CPC ....... B62D 25/163; B29C 70/68; B29C 70/72; B29L 2031/30; B29K 2995/0003
See application file for complete search history.

(56) References Cited

U.S. PATENT DOCUMENTS

| | | | | |
|---|---|---|---|---|
| 6,698,820 | B2 * | 3/2004 | Nakata | 296/193.09 |
| 7,497,491 | B2 | 3/2009 | Zanella et al. | |
| 7,782,180 | B2 | 8/2010 | Takafuji | |
| 8,267,216 | B2 | 9/2012 | Browne et al. | |
| 8,368,523 | B2 | 2/2013 | Takahashi et al. | |
| 2004/0195815 | A1 | 10/2004 | Browne et al. | |
| 2005/0275246 | A1 * | 12/2005 | Browne et al. | 296/187.04 |
| 2011/0037293 | A1 * | 2/2011 | Kralevich et al. | 296/198 |

FOREIGN PATENT DOCUMENTS

| | | |
|---|---|---|
| CN | 102795186 | 11/2012 |
| JP | 2011057070 | 3/2011 |
| JP | 2013023078 | 2/2013 |

* cited by examiner

*Primary Examiner* — Glenn Dayoan
*Assistant Examiner* — Melissa A Black
(74) *Attorney, Agent, or Firm* — Dierker & Kavanaugh, P.C.

(57) ABSTRACT

A fender bracket includes a composite structure having a first flange to operatively connect to a fender, a second flange to operatively connect to a vehicle body structure, and a web connecting the first flange and the second flange. At least one actuator is positioned in at least a portion of the web. The at least one actuator is selected from a piezoelectric actuator, an active material actuator, and a pyrotechnic actuator. The at least one actuator is to cause a fracture or buckling of the web in response to an activation signal.

13 Claims, 4 Drawing Sheets

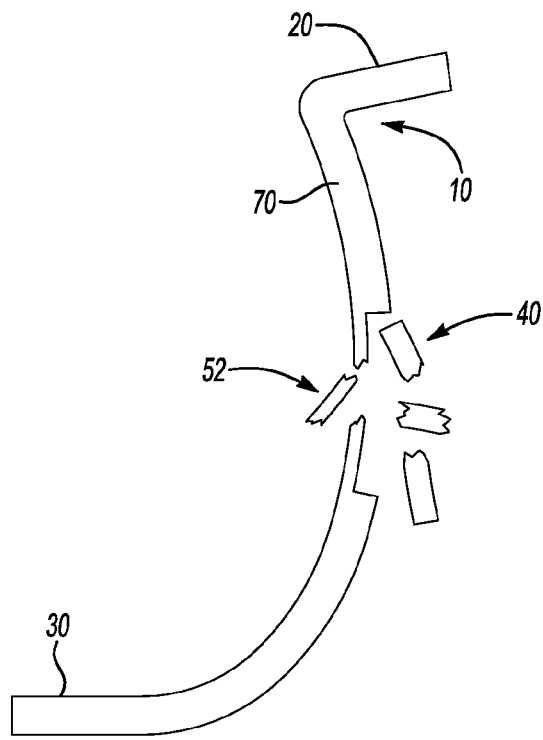
*Fig-3*
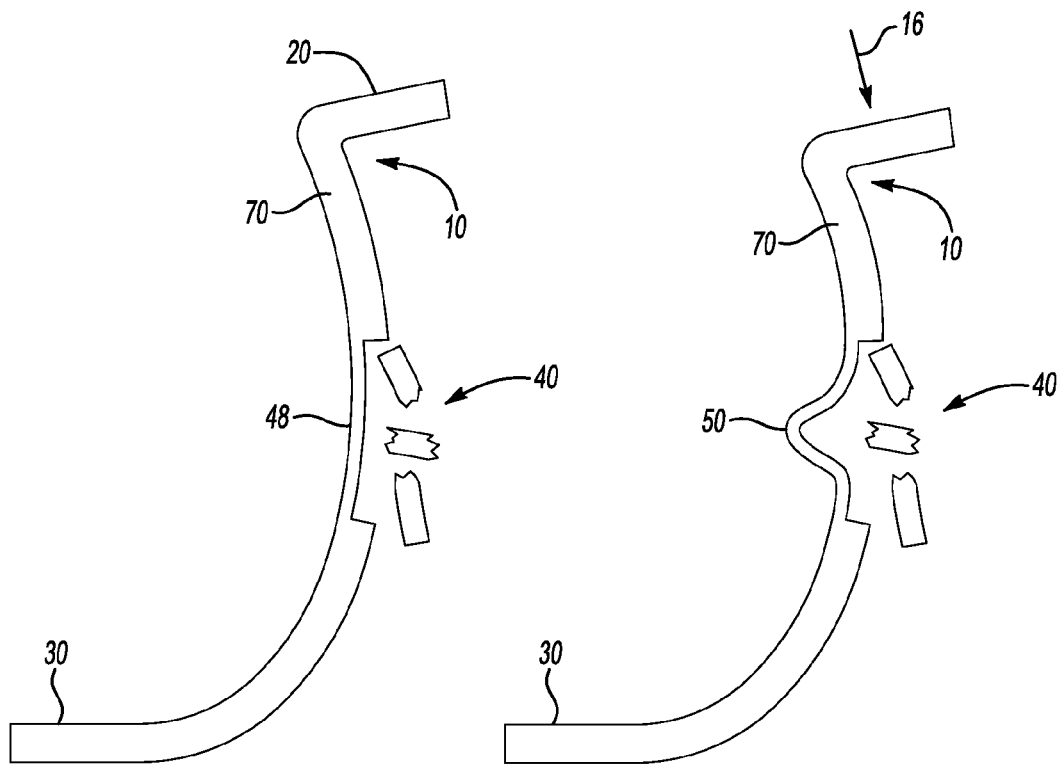
*Fig-4A*  *Fig-4B*

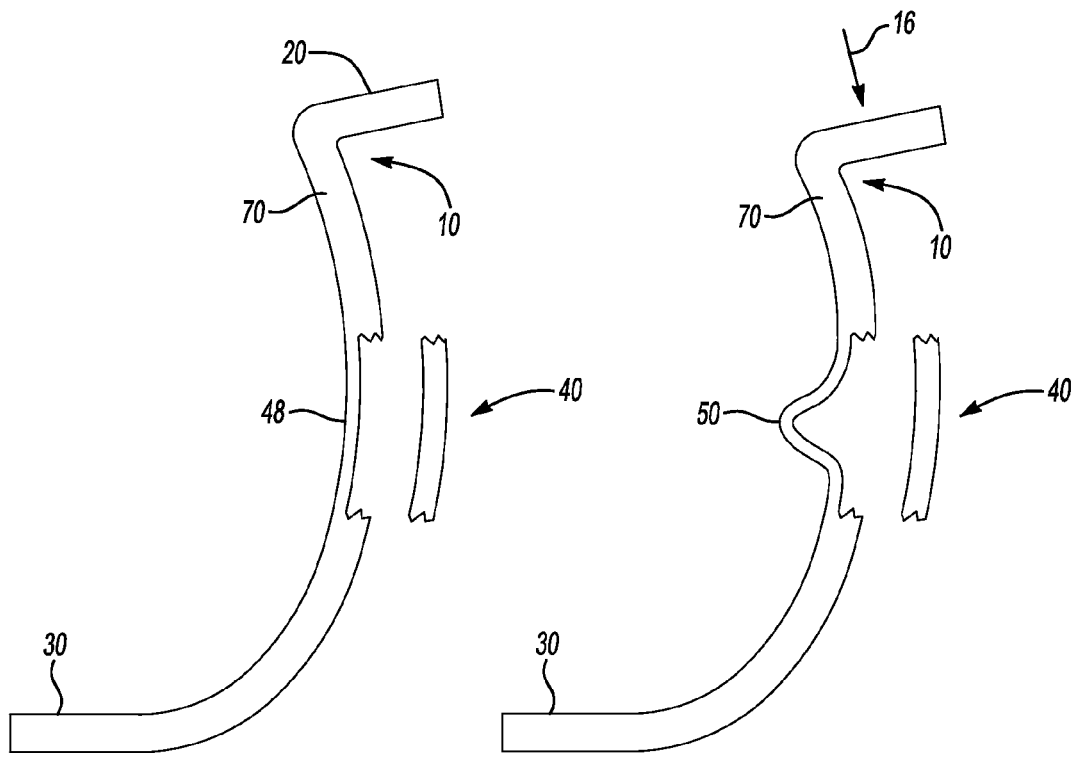
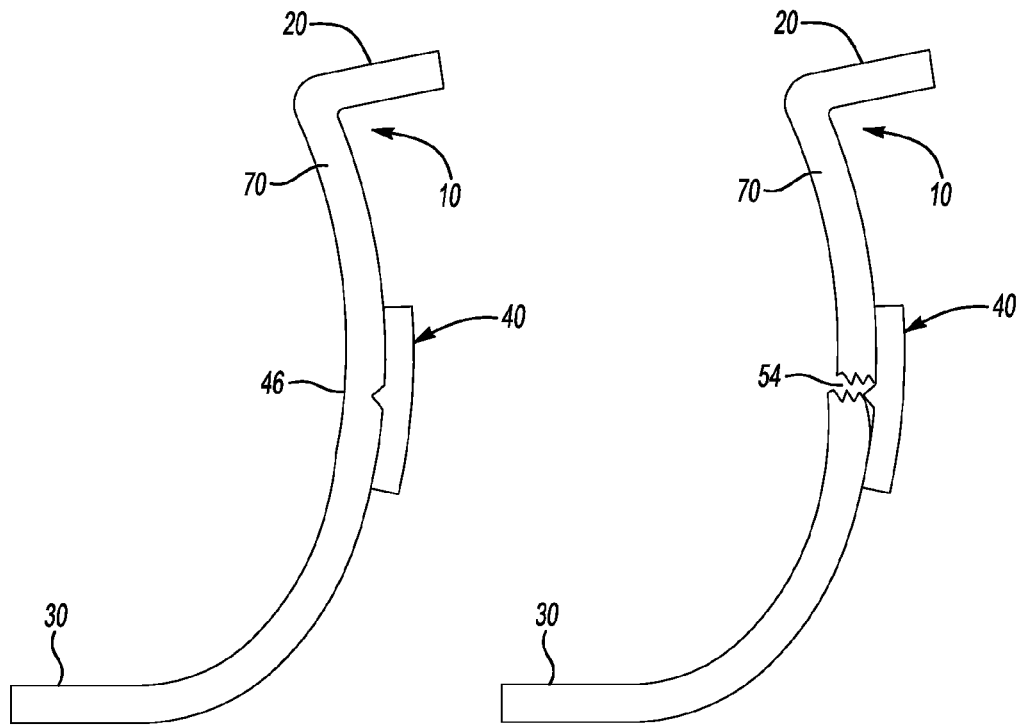

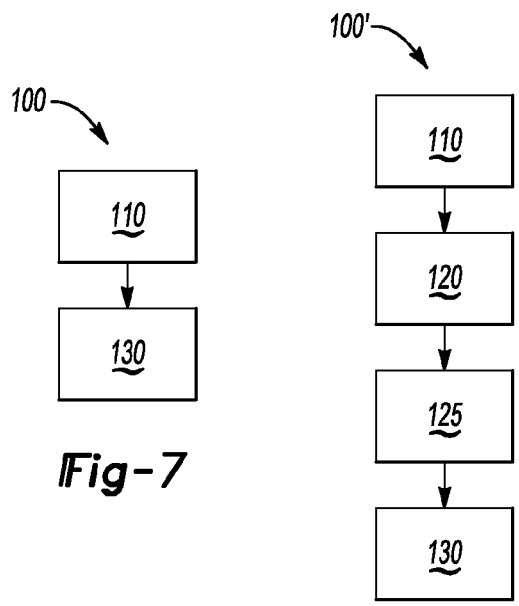
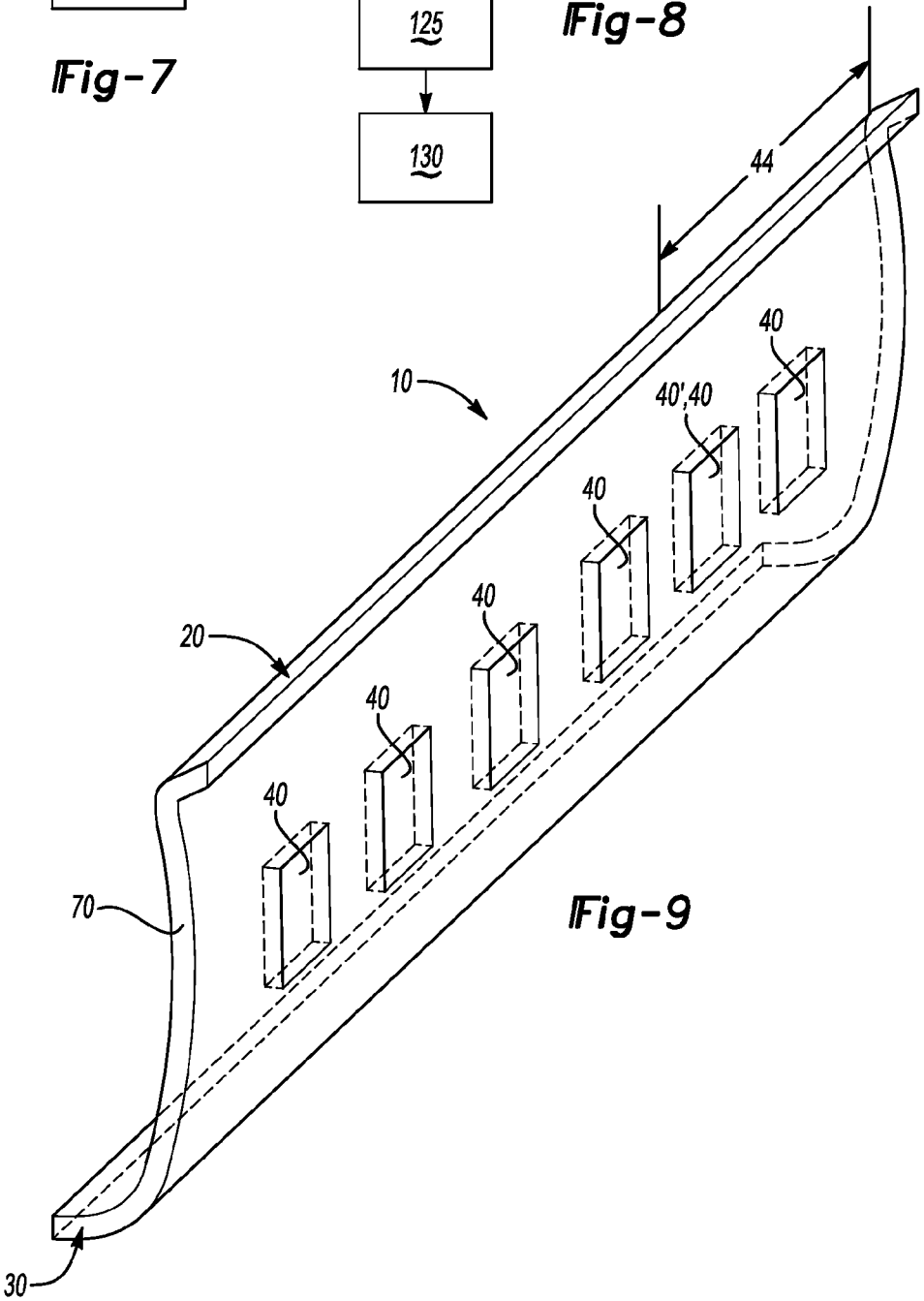

FENDER BRACKET

CROSS-REFERENCE TO RELATED APPLICATIONS

This application claims the benefit of U.S. Provisional Patent Application Ser. No. 61/860,034, filed Jul. 30, 2013, which is incorporated by reference herein in its entirety.

BACKGROUND

Some countries have standards and regulations in place for motor vehicles. These standards and regulations may provide minimum performance requirements for the motor vehicle as a whole, or for a particular piece of equipment within the motor vehicle. As examples, some countries have minimum standards and regulations with respect to controls and displays, brake hoses and systems, mirrors, etc.

SUMMARY

A fender bracket includes a composite structure having a first flange to operatively connect to a fender, a second flange to operatively connect to a vehicle body structure, and a web connecting the first flange and the second flange. An actuator is positioned in at least a portion of the web. The actuator is selected from a piezoelectric actuator, an active material actuator, and a pyrotechnic actuator. The actuator is to cause a fracture or buckling of the web in response to an activation signal.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a cross-sectional view of an example of the fender bracket having a fractured web and a fractured actuator after actuation of the actuator;

FIG. 4A is a cross-sectional view of an example of the fender bracket having a fractured actuator after actuation of the actuator;

FIG. 4B is a cross-sectional view of the fender bracket of FIG. 4A where the web has a buckled portion resulting from the fracture of the actuator;

FIGS. 5A and 5B are cross-sectional views of an example of the fender bracket before and after actuator activation, where the actuator substantially detaches intact from the bracket upon actuator activation, and where the fender bracket has a buckled web portion after actuator actuation;

FIGS. 6A and 6B are cross-sectional views of an example of the fender bracket before and after actuator activation, where the actuator is disposed on a surface of the web, and where the web is cracked after actuator actuation;

FIG. 7 is a flowchart depicting an example of a method of the present disclosure;

FIG. 8 is a flowchart depicting another example of a method of the present disclosure; and FIG. 9 is a semi-schematic perspective view of an example of a fender bracket with a plurality of actuators as disclosed herein.

DETAILED DESCRIPTION

In some instances, the desired mechanical properties for a single vehicle part are at odds with one another. As an example, it has been found that the strength and stiffness of the part may be compromised when the part is modified to enhance energy absorption. In the examples disclosed herein, a fender bracket that exhibits desirable levels of strength and stiffness is also capable of strategically softening to enhance energy absorption for certain operational modes (e.g., when the vehicle senses an impact).

As used herein, "softening" of a fender bracket means reducing an amount of support renderable by the fender bracket to the fender. As such, even though a hardness of a material that forms the bracket remains the same, a bracket may be softened by fracturing a web of the bracket, or reducing the cross-sectional area of the bracket as shown below. In examples having fender brackets formed from shape memory materials, the stiffness of the material may change as described more fully below.

Softening of the fender bracket and the corresponding reduction in support renderable by the fender bracket to the fender, may reduce acceleration and duration of the acceleration experienced by an object impacting the fender. A combination of acceleration and duration of the acceleration may be expressed in the following mathematical expression:

$$\left\{ \left[ \frac{1}{t_2 - t_1} \int_{t_1}^{t_2} a(t) dt \right]^{2.5} \right\}_{max}$$

where $t_1$ and $t_2$ are the initial and final times (in seconds) of a time interval during which the mathematical expression attains a maximum value, and acceleration a is measured in gs (1 standard g=9.81 meters per second squared). The maximum time duration ($t_2-t_1$) may be limited to a specific value ranging from about 3 to about 36 ms (milliseconds). For example, the maximum time duration may be about 15 ms.

Figure 1:
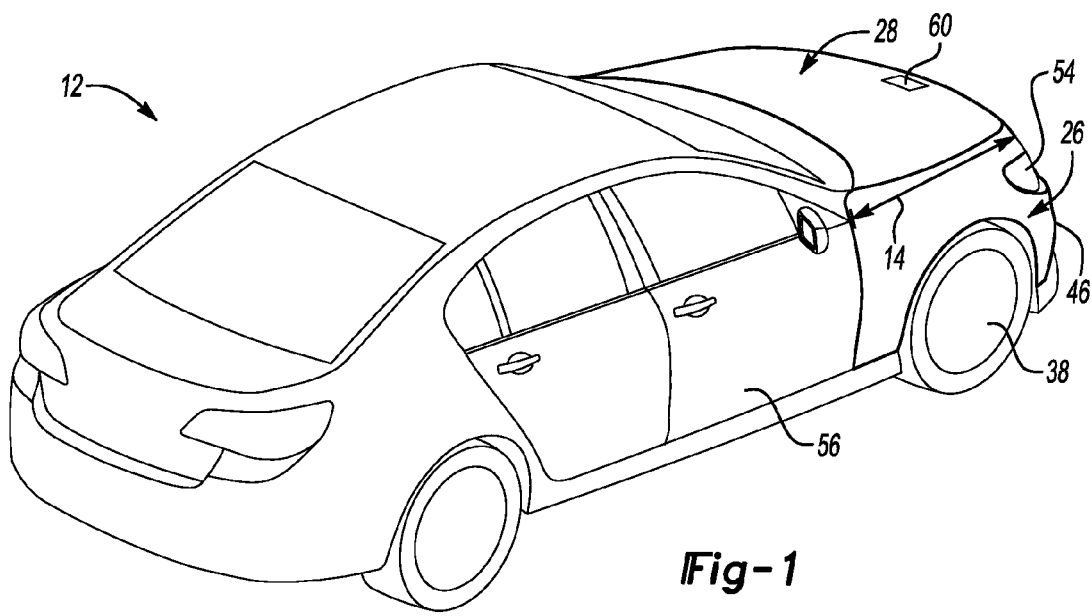
FIG. 1 a perspective view of a vehicle including an example of a sensor disclosed herein.

Referring now to FIG. 1, an example of a vehicle 12 is depicted. The vehicle 12 may be any mobile land vehicle having a fender 26 (i.e., the area around the wheel well and wheel 38) and a hood 28 covering an engine compartment and adjacent to the fender 26. Examples of the vehicle 12 include a car, a truck, a recreational vehicle (RV), or the like. In the examples disclosed herein, the fender 26 and the hood 28 may be made of any material, such as a metal and/or a composite material. In an example, the fender 26 is made of metal, and the hood 28 is made of a carbon fiber composite.

In this example, the vehicle 12 also includes a sensor 60. The sensor 60 may be any vehicle crash and/or collision detection sensor. The sensor 60 may be operatively connected to an interface that is operatively connected to a vehicle bus so that the sensor 60 can transmit vehicle-related event information to, for example, an in-vehicle telematics unit or infotainment unit that is also operatively connected to the vehicle bus. In an example, the sensor 60 provides information regarding the severity of a vehicle collision, such as the angle of impact and the amount of force sustained. The sensor 60 may also provide information (e.g., in the form of signals) regarding any impact sustained or encountered by the vehicle 12. The sensor 60 may be used alone or in combination with a collision avoidance system (which includes radar, laser, and/or camera sensors to detect an imminent impact).

In an example, the sensor 60 is associated with its own processor (not shown). The sensor processor may include computer program(s) for obtaining information from the sensor 60 and, in response, performing various vehicle functions, such as initiating the transmission of an activation signal to an actuator (shown at reference numeral 40 in FIG. 2). In other examples, the processor may include analog circuitry for processing a signal produced by the sensor 60. For example, the processor may include analog signal processing components. The processor may also include active components, such as transistors. The processor may perform switching functions based on sensor signals without having software programmability.

Figure 2:
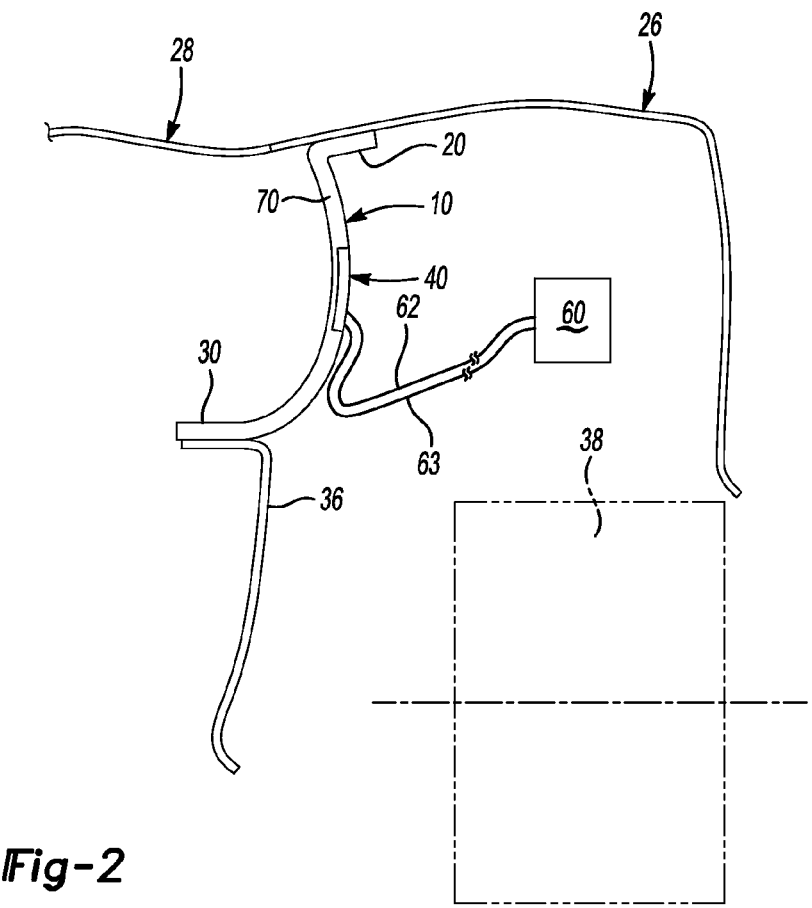
FIG. 2 is a cross-sectional view of an example of a fender bracket disclosed herein, the fender bracket including an actuator, being operatively positioned within the vehicle, and being operatively connected to the sensor.

The sensor 60 is operatively connected to the actuator 40, which is a component of the fender bracket 10 shown in FIG. 2. The sensor 60 may be operatively connected to the actuator 40 via conductors 62, 63. The conductors 62, 63 are capable of transmitting an appropriate activation signal, in response to a command from the sensor 60, to the actuator 40 in response to detecting an impact. As such, the type of conductor 62, 63 that is used may depend upon the type of actuator 40 that is used. In an example, the conductors 62, 63 may be electrical conductors such as wires or printed circuit traces.

Suitable actuators 40 include a piezoelectric actuator, an active material actuator, and a pyrotechnic actuator.

The piezoelectric actuator is made of a piezoelectric material that mechanically deforms (e.g., shrinks, enlarges, or undergoes some other dimensional change) in response to being exposed to a predetermined amount of electric voltage for a predetermined amount of time. It is to be understood that the dimensional change of the piezoelectric actuator causes a portion of the fender bracket 10 to fracture or buckle. Examples of piezoelectric materials include piezoceramics, such as barium titanate, lead titanate, lead zirconate titanate, etc., or piezopolymers, such as polyvinylidene difluoride (PVDS), a copolymer of P(VDF-TrFE) (i.e., poly(vinylidenefluoride-co-trifluoroethylene)), etc.

In examples of the present disclosure in which the actuator 40 is a piezoelectric actuator, the previously mentioned conductors 62, 63 may be wires that operatively connect the actuator 40 to a voltage source that operates in response to a signal from the sensor 60.

The active material actuator may be a shape memory alloy (SMA), a shape memory ceramic, or a shape memory polymer (SMP).

Shape memory alloys are a group of metallic materials that are able to return to a defined shape, size, etc. when exposed to a suitable stimulus. Shape memory alloys undergo phase transitions in which yield strength (i.e., stress at which a material exhibits a specified deviation from proportionality of stress and strain), stiffness, dimension, and/or shape are altered as a function of temperature. In the low temperature or Martensite phase, the shape memory alloy is in a deformable phase, and in the high temperature of Austenite phase, the shape memory alloy returns to the remembered shape (i.e., prior to deformation).

When the shape memory alloy is in the Martensite phase and is heated, it begins to change into the Austenite phase. The Austenite start temperature ($A_s$) is the temperature at which this phenomenon starts, and the Austenite finish temperature ($A_f$) is the temperature at which this phenomenon is complete. When the shape memory alloy is in the Austenite phase and is cooled, it begins to change into the Martensite phase. The Martensite start temperature ($M_s$) is the temperature at which this phenomenon starts, and the Martensite finish temperature ($M_f$) is the temperature at which this phenomenon finishes.

The examples of the shape memory alloys used herein exhibit a one-way shape memory effect. In the examples disclosed herein, the one-way shape memory alloys will be incorporated into the fender bracket 10 in the cold state (below $A_s$), and when heated (to the phase transition or switching temperature) will mechanically return to its remembered shape. This change in shape causes a portion of the fender bracket 10 to fracture or buckle.

Examples of the present disclosure may include a shape memory alloy that has a switching or transition temperature that is greater than a maximum under-hood open space temperature. In an example, the switching temperature of the shape memory material alloy is 80° C. or higher. It is to be understood that the temperature at which the shape memory alloy remembers its high temperature form when heated can be adjusted by slight changes in the composition of the alloy and through heat treatment. Suitable shape memory alloy materials for fabricating the actuator 40 include nickel-titanium based alloys (e.g., commercially available under the trademark NITINOL® from Shape Memory Applications, Inc.), indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits the desired shape memory effect.

Shape memory ceramics exhibit a similar effect as shape memory alloys. With shape memory ceramics, the phase transition is a ferroelastic or thermoelastic phase transition.

Other suitable shape memory materials are shape memory polymers. Similar to the behavior of a shape memory alloy, when the temperature is raised through its transition temperature, the shape memory polymer also undergoes a change in shape orientation. To set the permanent (or remembered) shape of the shape memory polymer, the polymer is heated to a temperature that is at or above the glass transition temperature (Tg) or the melting point of the hard block or sequence of the polymer. At this temperature, the memory polymer may be shaped by applying a force followed by cooling. Setting the temporary shape of the shape memory polymer requires the shape memory polymer material to be brought to a soft transition temperature which is at or above the Tg of the soft block or sequence of the polymer, but below the Tg or melting point of the hard block or sequence of the polymer. At the soft transition temperature, the temporary shape of the shape memory polymer may be set by applying a force and then cooling the polymer. The temporary shape is maintained as long as the shape memory polymer remains below the soft transition temperature.

In the examples disclosed herein, the shape memory polymer will be incorporated into the fender bracket 10 in the temporary shape. When the shape memory polymer is heated at or above the soft transition temperature, the shape memory polymer will mechanically return to its permanent or remembered shape. This change in shape causes a portion of the fender bracket 10 to fracture or buckle.

Any shape memory polymer may be selected that has a soft transition temperature that is greater than a maximum underhood open space temperature. In an example, the soft transition temperature of the shape memory material alloy is 80° C. or higher. Suitable shape memory polymers include thermoplastics or thermosets. The polymers may be linear or branched thermoplastic elastomers with side chains or dendritic structural elements. Suitable polymer components used to form a shape memory polymer may include polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbomyl-polyhedral oligomeric silsequioxane), polyvinylchloride, urethane/butadiene copolymers, polyurethane block copolymers, styrene-butadiene-styrene block copolymers, and the like.

When a shape memory alloy or shape memory polymer actuator is selected, the previously mentioned conductors 62, 63 may be any suitable mechanism that can supply heat to the actuator 40. As examples, the heat may be supplied using hot gas (e.g., air), steam, hot liquid, or an electrical current. The conductors 62, 63 may be attached to a heating device that is connected to the shape memory alloy/polymer, or the heating device may be integral with the actuator 40. The heating device may be in the form of an iron for supplying heat, a heated conduit that is in proximity of the actuator 40, a hot air blower or jet, a resistive heater, a conductive coating, a chemical reaction heater, and the like.

In an example, a pyrotechnic heater may be combined with a shape memory actuator. In the example, an actuation signal may be sent through the conductors 62, 63 to initiate a quick exothermic reaction in the pyrotechnic heater. The heat produced by the pyrotechnic heater may heat the shape memory actuator beyond the transition temperature, thereby causing the shape memory actuator to transition to the memorized shape, thereby inducing a fracture or buckling of the bracket 10.

The pyrotechnic actuator may be any actuator that uses energy released by a self-sustaining exothermic reaction of a pyrotechnic composition to move a device or apply a force. In general, the exothermic reaction of a pyrotechnic composition proceeds rapidly, and may, in some cases, create a shock wave in nearby materials. Some examples of pyrotechnic actuators are pyrotechnic pistons, pin-pushers, and pin-pullers. The pyrotechnic actuator may include a shaped charge or a detonation cord. In pyrotechnic pistons, a pyrotechnic charge generates gas in a cylinder to move a piston. In some cases, a compressed gas may be released into a cylinder via a pressure release disk that is ruptured by a pyrotechnic squib. A pyrotechnic squib is a small pyrotechnic charge that is usually initiated by an electrical voltage. A pyrotechnic squib may sometimes be known as an electric match or pyrotechnic initiator.

The exothermic reaction of a pyrotechnic composition does not rely on oxygen from an external source to sustain the reaction. Pyrotechnic compositions may include fuels and oxidizers combined with various additives to control the speed and yield of the exothermic reaction. A pyrotechnic actuator may have mechanical parts driven by the reaction of the pyrotechnic composition (e.g. a piston). In examples of the present disclosure, the pyrotechnic actuator may be substantially the pyrotechnic composition itself. For example, detonation cord may be a thin plastic tube or hollow ribbon filled with PETN (pentaerythritol tetranitrate). Upon initiation of the detonation cord, the rapid release and expansion of gas generates a shock wave radial to a length axis of the detonation cord that impacts a nearby target.

When a shaped charge is utilized, a pyrotechnic charge is initiated by an electric impulse (transmitted through conductors 62, 63). The shaped pyrotechnic charge generates a shock wave directed through the bracket 10. In examples having a shaped charge actuator, the shock wave may be prevented from impacting areas outside of a relatively narrow target zone. This shock wave causes a portion of the fender bracket 10 to fracture or buckle. When a detonation cord is utilized, the conductors 62, 63 are capable of igniting the detonation cord, which causes a fast energetic discharge producing a shock wave radially out from a centerline of the detonation cord that fractures or buckles a portion of the fender bracket 10.

As previously mentioned and as shown in FIG. 2, the actuator 40 may be positioned within the fender bracket 10. The fender bracket 10 is positioned at an area of the vehicle 12 to support the fender 26 adjacent to a margin with the hood 28. The fender bracket 10 generally extends the length 14 (shown in FIG. 1) of that area. As depicted in FIG. 2, the fender bracket 10 operatively connects the fender 26 to a vehicle body structure 36, such as a vehicle wheel house frame.

The fender bracket 10 is made up of a composite structure having a first flange 20, a second flange 30, and a web 70 that connects the first flange 20 and the second flange 30. The overall fender bracket 10 may have a Z or S shaped cross-section, as shown in FIG. 2. In fender bracket 10 may also have other cross sectional shapes including, for example, C-sections, L-sections and I-sections. The cross-section of the fender bracket 10 may be different at different stations along the length of the bracket 10, or the cross-section may be the same along the entire length of the bracket 10.

The composite structure may be a fiber reinforced composite (e.g., sheet molding compound), a fiber (e.g., carbon fiber) reinforced polymer, a non-reinforced thermoplastic (e.g., NORYL® GTX 90), or a reaction injection molded composite (e.g., polyurethane).

The first flange 20 of the fender bracket 10 is capable of operatively connecting to the fender 26, and the second flange of the fender bracket 10 is capable of operatively connecting to the vehicle body structure 36. An adhesive or a suitable mechanical securing mechanism may be used to connect the fender bracket 10 at the respective first flange 20 to the fender 26 and the second flange 30 to the vehicle body structure 36.

The web 70 of the fender bracket 10 is a solid piece of the composite material used to form the composite structure. In an example, the web 70 does not have any holes in it other than holes used in conjunction with a securing mechanism (e.g., a bolt, screw, etc.).

The web 70 may have the actuator 40 positioned therein. In an example, the actuator 40 is positioned in the web 70 so that the actuator 40 extends the entire length (e.g., a length that is comparable to length 14 shown in FIG. 1) of the web 70 and of the composite structure. In this example, the actuator 40 does not extend through the entire thickness of the web 70 or the entire height of the web 70 (as shown in FIG. 2). In another example, one or more actuators 40 may be positioned at each hard zone of the web 70. A hard zone is an area of the web 70 that has the highest hardness value or strength value as compared to other areas of the web 70. A single web 70 may have one hard zone or multiple hard zones. In one example, the actuators 40 are periodically spaced along the length of the web 70 at the hard zones. The hard zone(s) may be identified using math modeling or another suitable hardness test or strength test. In this example, the actuator(s) 40 do not extend through the entire thickness of the web 70 or the entire height of the web 70 (as shown in FIG. 2).

In an example, a plurality of the actuators 40 may be positioned at spaced locations in a portion of the web 70 (see FIG. 9). The actuators 40 may be spaced periodically; however, examples may have actuators 40 spaced apart without any repeating pattern in the spacing.

In still another example, a detonation cord actuator 40 may be placed along the length of the web 70 to selectively fracture the entire web 70 substantially at once. As used herein, "substantially at once" means within about one millisecond. Since the detonation cord detonates at greater than 4000 m/s (meters per second), the entire length of the bracket 10 is fractured substantially at once. It is to be understood that a low-yield detonation cord may discharge sufficient energy to fracture the bracket 10 according to the present disclosure.

The actuator 40 may be incorporated into the web 70 using co-molding (e.g., ejection molding). As disclosed herein, a method for making a fender bracket 10, includes co-molding an actuator 40 into a composite structure that forms a web 70 of the fender bracket 10. The web 70 connects the first flange 20 that is to operatively connect to the fender 26 and the second flange 30 that is to operatively connect to a vehicle body structure. The actuator 40 is selected from a piezoelectric actuator, an active material actuator, and a pyrotechnic actuator.

As illustrated in FIG. 2, the conductors 62, 63 operatively connect the actuator(s) 40 with the sensor 60. As described above, the conductors 62, 63 used may vary, depending upon the type of actuator that is selected. When the sensor 60 detects an impact, the sensor 60 will transmit a signal to the conductors 62, 63 to initiate the transmission of a suitable activation signal to the actuator. As described above in reference to the actuators 40, the conductors 62, 63 may be capable of transmitting electricity, heat, or some means for initiating detonation in a detonation cord.

In any of the examples disclosed herein, it is to be understood that upon activation of the actuator 40 in response to the activation signal, the actuator 40 may detach intact from the portion of the fender bracket 10 as a result of the shape change or detonation. The remaining portion of the web 70 at the area of the web 70 that is adjacent to the actuator 40, may fracture or buckle under load 16, which is also identified by the arrow at the top of FIG. 4B. In other cases, the actuator 40 may fracture and only portions of the actuator 40 may detach from the web 70. In all of the examples disclosed herein, the bracket 10 is permanently weakened after actuation of the actuator 40, and would not revert to a pre-actuation condition without being refurbished or remanufactured. It is contemplated that the bracket 10 would be replaced after actuation of the actuator 40. In an example, the activation signal is sent to the actuator 40 that is positioned across the entire length of the web 70. The length of the web 70 is a dimension of the web in the direction of the length 14 shown in FIG. 1. As such, the web 70 fractures or buckles along its entire length. In another example, the activation signal is sent to individual actuators 40 that are positioned at respective hard zones. As such, the web 70 fractures or buckles at each of the hard zones. In still another example, the processor associated with the sensor 60 may identify where along the length of the web 70 the impact has taken place, and then transmit the activation signal to the actuator(s) 40 located at the impact area. In determining where the impact has taken place, the processor may evaluate any sensed data, including vehicle velocity, force of the impact, and other suitable parameters.

In another example of the present disclosure, the processor associated with the sensor 60 may identify a first impact location that is remote from the fender bracket and transmit the activation signal to the actuator(s) 40 located in any target location on the fender bracket in response to the sensed data. The target location may, for example, be a location of a potential second impact location. For example, based on sensed data, including vehicle velocity, force of the first impact, and other suitable parameters, the processor may determine that a first impact occurred at a bumper 46 near the right head-lamp 54. In response to the determination, the processor may transmit the activation signal to the actuator(s) 40 on the fender bracket 10 on the right side 56 of the vehicle 12 and not to the fender bracket on the left side of the vehicle. Similarly, the processor may determine that the first impact occurred at any location and transmit the activation signal to selected actuator(s) in response to the determination. The fracture or buckling of the web 70 in response to the activation signal causes the fender bracket 10 to provide a reduced amount of support to the fender in a predetermined location on the fender 26 after the fracture or buckling of the web 70.

FIGS. 3 through 6 illustrate different examples of actuator 40 mounting, and results of actuation of actuator 40.

In FIG. 3, upon receiving the activation signal (in response to the sensor 60 detecting an impact with the vehicle 12), the actuator 40 itself fractures. This detaches the actuator 40 from the web 70. This detachment causes the web 70, at least at an area adjacent to the actuator 40, to fracture (shown at reference numeral 52). The web 70 and fender bracket 10 is permanently weakened as a result. The fracturing of the web 70 may occur as a result of weakening of the web 70 from the thickness reduction caused by the detachment of the actuator 40. In another example, the fracturing of the web 70 may be induced directly from the same forces that cause the fracturing of the actuator 40. For example, the actuator 40 may produce a shock wave that fractures both the actuator 40 and the web 70.

In FIG. 4A, upon receiving the activation signal (in response to the sensor 60 detecting an impact with the vehicle 12), the actuator 40 itself fractures. This detaches the actuator 40 from the web 70. In this example, the detachment causes the web 70, at least at a thin portion 48 that is adjacent to the actuator 40, to buckle (shown at reference numeral 50). The buckled portion 50 substantially reduces the capacity of the bracket 10 to support loads 16 that may be applied, as shown at the arrow at the top of FIG. 4B. As such, the bracket 10 is permanently weakened. It is to be understood that the buckling may not occur until the load 16 is applied; however, the thin portion 48 is too thin to support the load 16 without buckling.

The magnitude of the buckling load 16 depends, at least in part, on the type of material used for the composite structure (e.g., the type of reinforcement material, such as glass, carbon fiber, etc. that is included) and the volume fraction of reinforcement. For example, the load magnitude for a glass fiber reinforced bracket of 1.0 mm may be about 80 N/mm. The buckling load 16 may also depend on the length of the section to be buckled, time profile of the load 16, as well as any asymmetry in the application of the load 16 applied to the section. Buckling is elastic instability in a section of the bracket 10. Mathematically, there will be a bifurcation in the equations of static equilibrium. For example, a bracket 10 may support a given load 16 like a column provides vertical support in a building. In one form of the column buckling, when the column buckles, portions of the column may move sideways, disrupting the ability of the column to support a vertical load. It is to be understood that the fender bracket 10 may be designed to buckle under a wide range of loads 16 resulting from an impact.

In the example depicted in FIG. 5A, before actuation, the actuator 40 is embedded in the web 70. Upon receiving the activation signal (in response to the sensor 60 detecting an impact with the vehicle 12), the actuator 40 itself undergoes a change in shape (e.g., shrinks or bends) and as a result detaches from the web 70 at the thin portion 48. In this example, the detachment causes the web 70, at least at a thin portion 48 that is adjacent to the actuator 40, to buckle (shown at reference numeral 50 in FIG. 5B). The buckled portion 50 substantially reduces the capacity of the bracket 10 to support loads 16 that may be applied, as shown in the arrow at the top of FIG. 5B. As such, the bracket 10 is permanently weakened. It is to be understood that the buckling may not occur until the load 16 is applied; however, the thin portion 48 is too thin to support the load 16 without buckling.

In FIG. 6A, the actuator 40 is mounted on a surface of the web 70. In this example, the actuator 40 includes a stress-inducing protrusion that extends into the adjacent portion 46 of the web 70 upon actuator 40 activation. Upon receiving the activation signal (in response to the sensor 60 detecting an impact with the vehicle 12), the actuator 40 induces a force pulse or shock wave, which causes the stress-inducing protrusion to push into the portion 46 of the web 70 adjacent thereto. In this example, the stress induced by the protrusion powered by the pulse or shock wave causes the web 70, at least at the portion 46 that is affected by the stress, to fracture (shown at reference numeral 54 in FIG. 6B). The fractured portion 54 permanently weakens the fender bracket 10.

It is to be understood that in place of a stress-inducing protrusion, a notch may be included in the web 70 to make the web 70 frangible upon experiencing the pulse or shock wave. In an example, a pyrotechnic actuator is mounted on the surface of the web 70. The pyrotechnic actuator may be a shaped charge pyrotechnic actuator that discharges a shock wave through the web 70 (e.g., at the notch) to fracture the web 70 without producing fragments on the side of the actuator 40 distal to the mounting surface. It is to be understood that when the web 70 includes the notch, the web 70 is designed so that it does not prematurely fracture or buckle under routine and regular service loads 16.

In the examples depicted in FIGS. 3, 4A, 4B, 5A, and 5B, since the actuator 40 is integrated into the thickness of the web 70, the effective thickness of the web 70 is reduced after actuator 40 activation. This is due to the change in dimension (e.g., shrinking, enlarging, etc.) of the actuator 40 or the fracturing of the actuator 40, which causes the actuator 40 to detach from the load bearing path through the web 70. In an example, prior to actuator 40 activation, the thickness of the web 70 is about 2.5 mm, and after actuator 40 activation, the thickness of the web 70 ranges from about 0.5 mm to about 2.0 mm. This reduction in web 70 thickness contributes, at least in part and in some examples, to the fracturing or buckling of the web 70.

It is to be understood that the actuator 40 is capable of completing the fracture or initiating buckling in the web 70 in less than 30 milliseconds (ms) from a start of receiving the activation signal. In some instances, the actuator 40 is capable of completing the fracture or initiating buckling in the web 70 in a time ranging from about 20 ms to about 30 ms. In some other instances, the actuator 40 is capable of completing the fracture or initiating buckling in the web 70 in less than 10 milliseconds (ms) from a start of receiving the activation signal.

FIG. 7 is a block diagram depicting an example of a method 100 for softening a fender bracket of a vehicle as disclosed herein. The block at 110 depicts detecting an impact with the vehicle via an in-vehicle sensor. As used herein, "in-vehicle" means the sensor is located in or on the vehicle. The sensor 60 may be attached to the vehicle 12, or located within a container (not shown) that is attached to the vehicle. Non-limiting examples of sensors 60 include a crash sensor, an accelerometer, a camera, an infra-red detector, a switch, a force detector, a pressure gage, etc.

At block 130, the method includes: in response to the detecting 110, transmitting an activation signal to a target actuator 40' positioned in at least a portion of a web of a composite structure of the fender bracket 10, the web 70 connecting a first flange 20 and second flange 30 of the composite structure. The target actuator 40' may be a piezoelectric actuator, an active material actuator, or a pyrotechnic actuator. The first flange 20 is connected to a fender 26 of the vehicle 12 and the second flange 30 is connected to a body structure of the vehicle 12, thereby causing the target actuator 40' to cause a fracture or buckling of the web 70 of the fender bracket 10 in response to the activation signal.

FIG. 8 is a block diagram depicting an example of the method 110' that includes blocks 110 and 130 from method 110 depicted in FIG. 7. The example of the method 110' further includes block 120 between the detecting 110 and the transmitting 130. Block 120 represents, in response to the detecting 110, selecting a position along the bracket 10 for a localized softening of support renderable to the fender 26 by the fender bracket 10. Block 125 represents selecting the target actuator 40' from a plurality of actuators 40, each actuator 40 positioned at respective spaced locations, based on a location of the target actuator 40' corresponding to the selected position.

FIG. 9 is a semi-schematic perspective view of an example of a fender bracket 10 with a plurality of actuators 40 as disclosed herein. Each actuator 40 is positioned at a respective spaced location in a portion of the web 70. A position along the bracket 10 is depicted at 44. In an example, the position 44 may be selected for localized softening of support renderable to the fender 26 by the fender bracket 10. Out of the plurality of actuators 40 depicted in FIG. 9, the target actuator 40' corresponds to the position 44.

It is to be understood that the ranges provided herein include the stated range and any value or sub-range within the stated range. For example, a range from about 20 ms to about 30 ms should be interpreted to include not only the explicitly recited limits of about 20 ms to about 30 ms, but also to include individual values, such as 22 ms, 25.5 ms, 29 ms, etc., and sub-ranges, such as from about 21 ms to about 26 ms; from about 22 ms to about 29 ms, etc. Furthermore, when "about" is utilized to describe a value, this is meant to encompass minor variations (up to +/−5%) from the stated value.

Further, the terms "connect/connected/connection" and/or the like are broadly defined herein to encompass a variety of divergent connected arrangements and assembly techniques. These arrangements and techniques include, but are not limited to (1) the direct connection between one component and another component with no intervening components therebetween; and (2) the connection of one component and another component with one or more components therebetween, provided that the one component being "connected to" the other component is somehow operatively connected to the other component (notwithstanding the presence of one or more additional components therebetween).

In describing and claiming the examples disclosed herein, the singular forms "a", "an", and "the" include plural referents unless the context clearly dictates otherwise.

Additionally, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

The invention claimed is:

1. A fender bracket, comprising:
    a composite structure having a first flange to operatively connect to a fender, a second flange to operatively connect to a vehicle body structure, and a web connecting the first flange and the second flange; and
    at least one actuator positioned in at least a portion of the web, the at least one actuator being selected from a piezoelectric actuator, an active material actuator, and a pyrotechnic actuator, and the at least one actuator to cause a fracture or buckling of the web in response to an activation signal, wherein the at least one actuator is positioned within a hard zone of the web, and wherein the hard zone has a highest hardness or strength value as compared to an other portion of the web.

2. The fender bracket as defined in claim 1 wherein the composite structure is selected from the group consisting of a fiber reinforced composite, a non-reinforced thermoplastic, and a reaction injection molded composite.

3. The fender bracket as defined in claim 1 wherein the at least one actuator extends an entire length of the composite structure.

4. The fender bracket as defined in claim 1 wherein the at least one actuator includes a plurality of the actuators, each actuator positioned at a respective spaced location in the at least a portion of the web.

5. The fender bracket as defined in claim 1 wherein the fracture or buckling of the web in response to the activation signal causes the fender bracket to provide a reduced amount of support to the fender in a predetermined location on the fender after the fracture or buckling of the web.

6. The fender bracket as defined in claim 1 wherein prior to receiving the activation signal the web has a thickness of about 2.5 mm, and wherein after receiving the activation signal the web has a thickness ranging from about 0.5 mm to about 2.0 mm.

7. The fender bracket as defined in claim 1 wherein the at least one actuator is capable of completing the fracture or initiating buckling in the web in less than 30 milliseconds from a start of receiving the activation signal.

8. The fender bracket as defined in claim 1 wherein the active material in the active material actuator is a shape memory alloy (SMA), a shape memory ceramic, or a shape memory polymer (SMP).

9. The fender bracket as defined in claim 1 wherein the pyrotechnic actuator includes a shaped charge.

10. The fender bracket as defined in claim 1 wherein the pyrotechnic actuator includes a detonation cord.

11. A method for making a fender bracket, comprising co-molding a pyrotechnic actuator into a composite structure that forms a web of the fender bracket, the web connecting a first flange that is to operatively connect to a fender and a second flange that is to operatively connect to a vehicle body structure, wherein the pyrotechnic actuator is positioned within a hard zone of the web, and wherein the hard zone has a highest hardness or strength value as compared to an other portion of the web.

12. A method for softening a fender bracket of a vehicle, comprising:
    via an in-vehicle sensor, detecting an impact with the vehicle; and
    in response to the detecting, transmitting an activation signal to a target actuator positioned in at least a portion of a web of a composite structure of the fender bracket, the web connecting a first and second flange of the composite structure
    wherein:
        the target actuator is a piezoelectric actuator, an active material actuator, or a pyrotechnic actuator;
        the target actuator is positioned within a hard zone of the web;
        the hard zone has a highest hardness or strength value as compared to an other portion of the web; and
        the first flange is connected to a fender of the vehicle and the second flange is connected to a body structure of the vehicle, thereby causing the target actuator to cause a fracture or buckling of the web of the fender bracket in response to the activation signal.

13. The method as defined in claim 12, further comprising:
    between the detecting and the transmitting, in response to the detecting, selecting a position along the bracket for a localized softening of support renderable to the fender by the fender bracket; and
    selecting the target actuator from a plurality of actuators, each actuator of the plurality of actuators positioned at respective spaced locations, based on a location of the target actuator corresponding to the selected position.

* * * * *